United States Patent
Minchhoff

[11] 3,756,261
[45] Sept. 4, 1973

[54] METHOD AND APPARATUS FOR CONNECTING A TAP TO A PIPELINE

[75] Inventor: Paul Joseph Minchhoff, Harrisburg, Pa.

[73] Assignee: AMP Incorporated, Harrisburgh, Pa.

[22] Filed: Nov. 16, 1971

[21] Appl. No.: 199,120

[52] U.S. Cl. .................................. 137/15, 137/318
[51] Int. Cl. .......................... B23b 41/08, F16e 41/04
[58] Field of Search ................ 138/97; 137/15, 315, 137/317, 318; 408/110

[56] References Cited
UNITED STATES PATENTS

| | | |
|---|---|---|
| 3,307,435 | 3/1967 | Floren ................................ 137/318 |
| 3,349,792 | 10/1967 | Larkin ................................ 137/318 |
| 3,633,599 | 1/1972 | Roos ................................ 137/318 X |

*Primary Examiner*—Martin P. Schwadron
*Assistant Examiner*—David R. Matthews
*Attorney*—William J. Keating et al.

[57] ABSTRACT

According to the invention a fitting having an outlet passageway is initially located on a pipeline to be tapped. The fitting includes a cylindrical cutting blade and an expandable sealing wafer internally of a radially expandable tubular insert. The cutting blade, sealing wafer and insert are threadably advanced internally of the fitting, causing the cutting blade to remove a coupon portion from the pipeline and provide an aperture through the pipeline sidewall. The tubular insert and sealing wafer are partially inserted into the pipeline, with the wafer being expanded to radially expand the tubular insert into sealing engagement within the pipeline sidewall. When the coupon portion, cutter blade and sealing wafer are removed from the pipeline, the pipeline interior will communicate with the fitting through the tubular insert which operatively couples the fitting to the pipeline. Additionally, an interference fit of the tubular insert within the pipeline sidewall and a portion of the fitting which encircles the pipeline aperture assures a positive pressuretight seal encircling the tubular insert.

3 Claims, 9 Drawing Figures

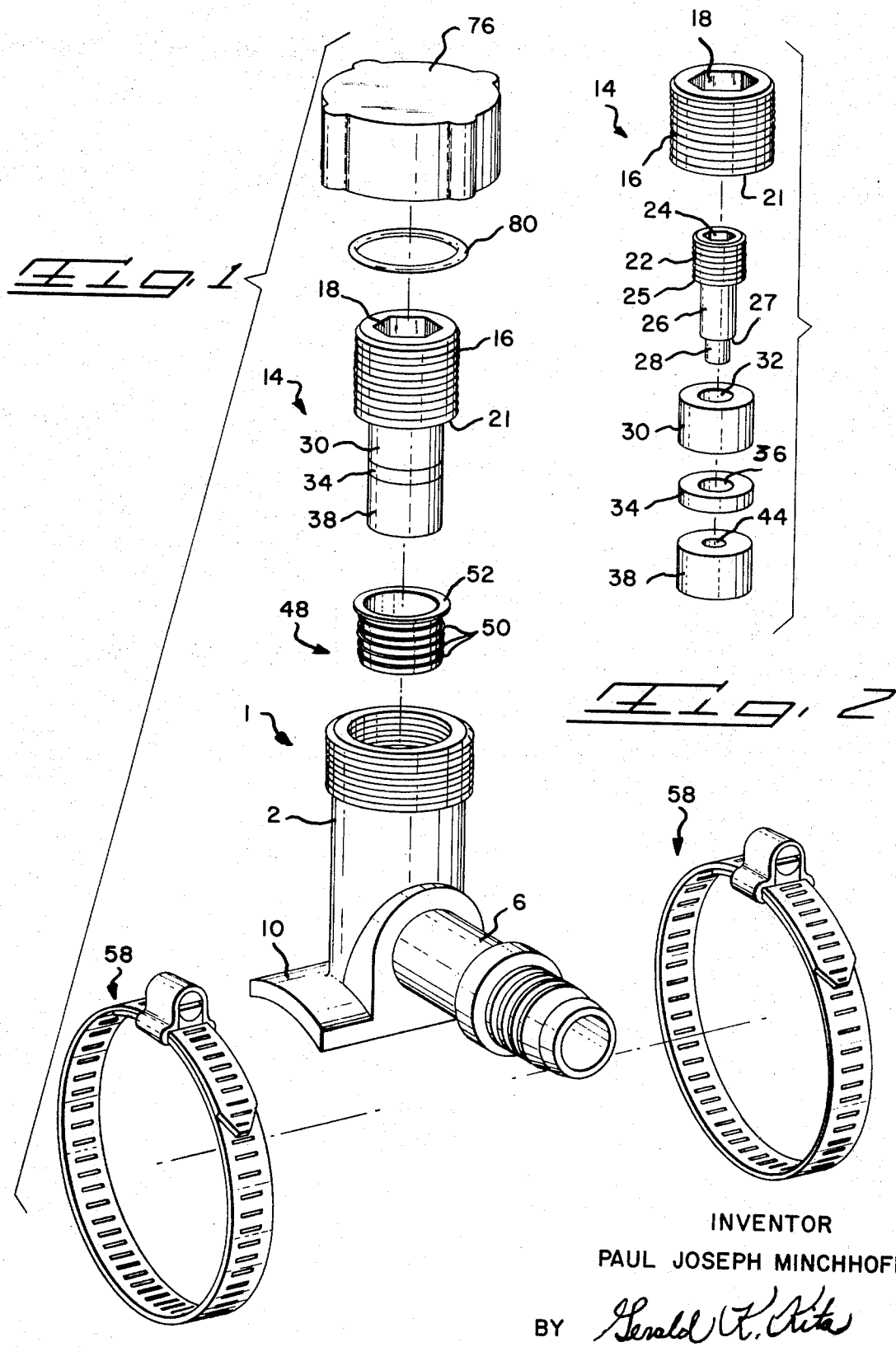

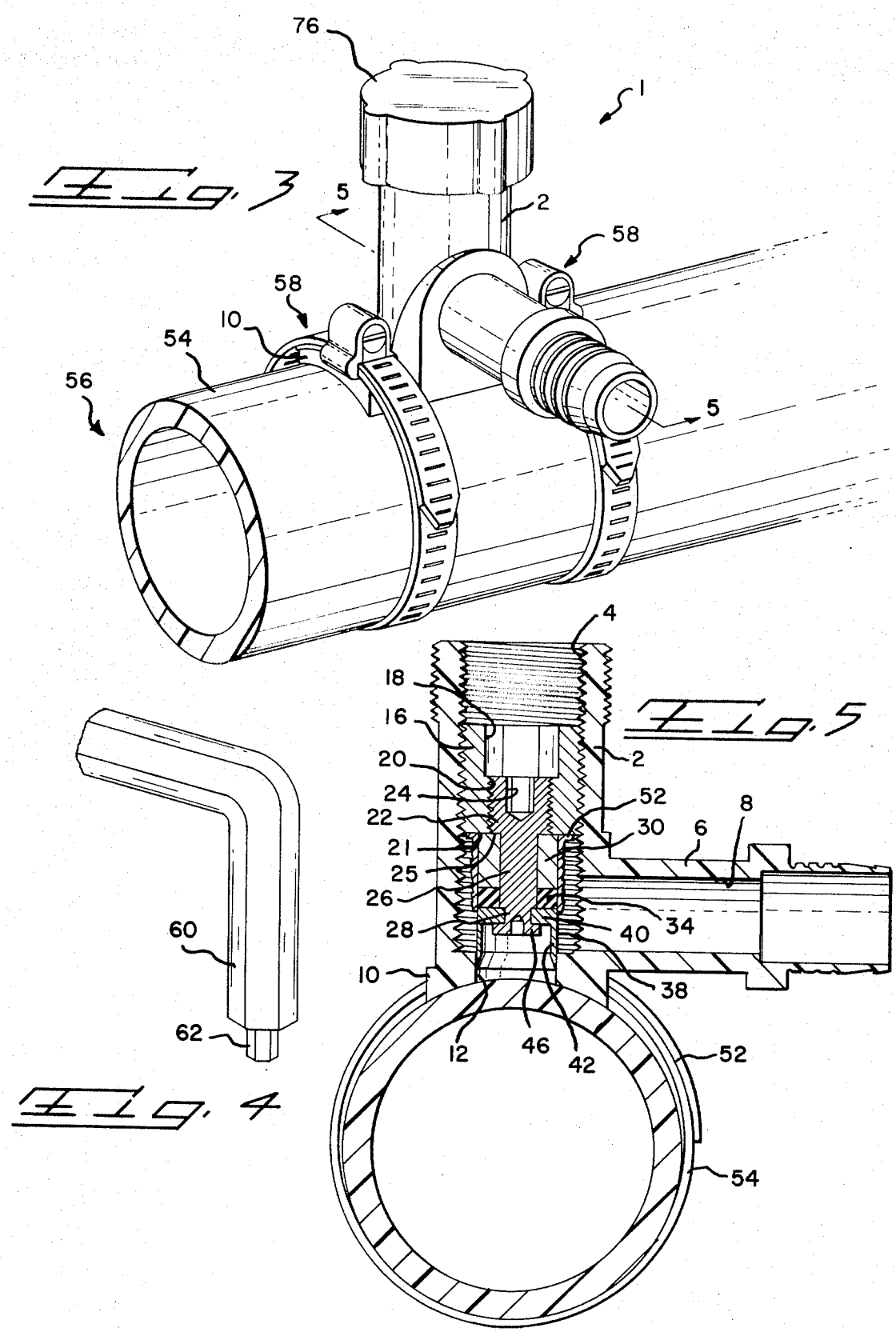

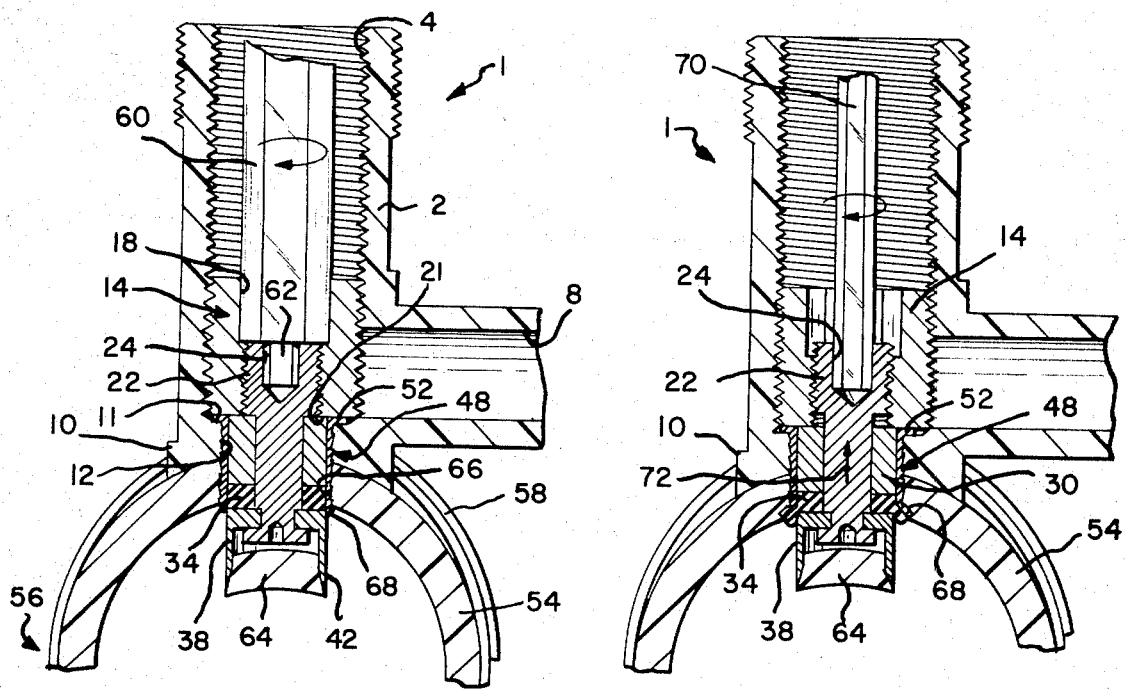
Fig. 6
Fig. 7
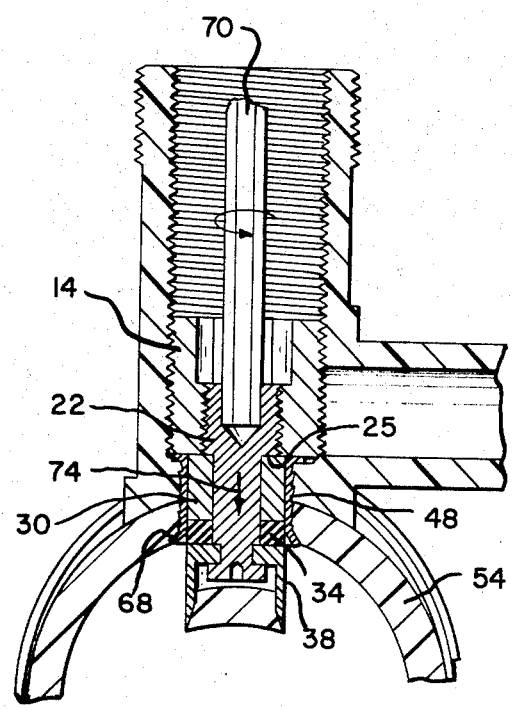
Fig. 8
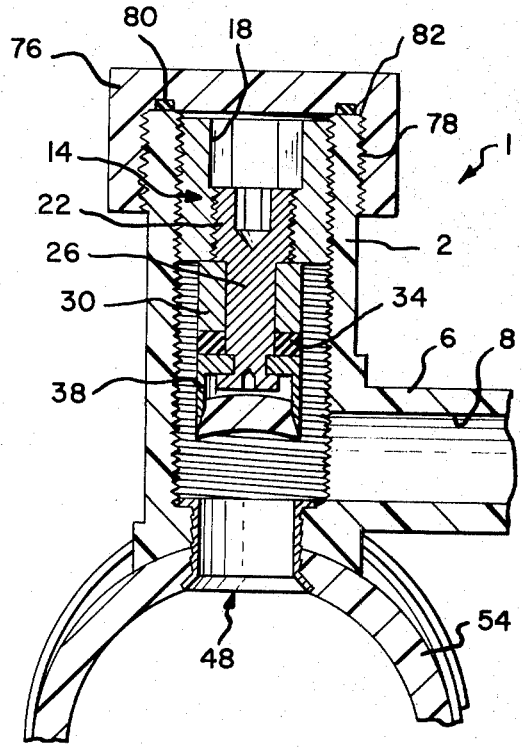
Fig. 9

METHOD AND APPARATUS FOR CONNECTING A TAP TO A PIPELINE

The present invention relates generally to a method and apparatus for tapping into a pipeline and more specifically to a method and apparatus for tapping into a pipeline and operatively coupling a tap-off fitting to the pipeline without a need for temporarily interrupting the flow of material conveyed in the pipeline. The invention has particular utility in supplying fuel gas through a main pipeline to a plurality of customers which are tapped directly into the main. Such customers rely upon an uninterrupted supply of gas. Accordingly, it is important to avoid temporary interruption of the gas flow in the pipeline when additional fittings are coupled thereto or when individual existing fittings need to be replaced. According to the invention a fitting having an outlet passageway is initially located on a pipeline to be tapped. The fitting includes a cylindrical cutting blade and an expandable sealing wafer internally of a radially expandable tubular insert. The cutting blade, sealing wafer and insert are threadably advanced internally of the fitting, causing the cutting blade to remove a coupon portion from the pipeline and provide an aperture through the pipeline sidewall. The tubular insert and sealing wafer are partially inserted into the pipeline, with the wafer being expanded to radially expand the tubular insert into sealing engagement within the pipeline sidewall. When the coupon portion, cutter blade and sealing wafer are removed from the pipeline, the pipeline interior will communicate with the fitting through the tubular insert which operatively couples the fitting to the pipeline. Additionally, an interference fit of the tubular insert within the pipeline sidewall and a portion of the fitting which encircles the pipeline aperture assures a positive pressuretight seal encircling the tubular insert.

Accordingly, it is an object of the present invention to provide a method and apparatus for tapping into a pipeline and operatively coupling a tap-off fitting thereto without a need for temporarily interrupting the flow of material being conveyed in the pipeline.

Another object of the present invention is to provide a method and apparatus for anchoring and sealably coupling a tap-off fitting to a pipeline.

It is another object of the present invention to provide a method and apparatus for anchoring and sealably coupling a tap-off fitting to a pipeline with a tubular insert sealably imbedded in both the fitting and the pipeline.

Another object of the present invention is to provide a method and apparatus for anchoring and sealably coupling a tap-off fitting to a pipeline with a tubular insert sealably imbedded in the fitting and with at least a portion of the tubular insert being radially expandable to grippingly engage the pipeline sidewall.

Other objects and many attendant advantages of the present invention will become apparent upon perusal of the following detailed description taken in conjunction with the accompanying drawings, wherein:

FIG. 1 is a perspective of the preferred embodiment of a fitting according to the present invention with component parts illustrated in exploded configuration to illustrate the details thereof;

FIG. 2 is a perspective of additional component parts of the preferred embodiment as shown in FIG. 1 in exploded configuration to illustrate the details thereof;

FIG. 3 is a fragmentary perspective of a fitting according to the present invention shown initially located on a pipeline;

FIG. 4 is a fragmentary perspective of a hand tool used for operatively coupling the preferred embodiment to a pipeline;

FIG. 5 is a section taken generally along the line 5—5 of FIG. 3;

FIGS. 6, 7, 8 and 9 are enlarged fragmentary elevations in section of the preferred embodiment as shown in FIG. 5 illustrating in sequence the successive operations required to operatively couple the preferred embodiment to a pipeline.

With more particular reference to FIGS. 3 and 4 of the drawings, there is shown generally at 1 a preferred embodiment of a tap-off fitting according to the present invention. The fitting includes a tubular body portion 2, the internal diameter of which is internally threaded as shown at 4. The body portion 2 is further provided with an integral reduced cylindrical stem portion 6, an internal diameter portion which is defined by a sidewall 8 and which is in communication with the internal diameter portion of the fitting defined by an internally threaded sidewall 4. The stem 6 and body member 2 provide a generally T-shaped configuration, with the internal diameter portion of the stem providing an outlet passageway for the fitting 1. At one end of the tubular portion 2 of the fitting is provided an integral, segmented cylindrical or arcuate flange portion 10 which is provided with a reduced diameter bore 12 therethrough which bore extends through the bottom wall 11 of the internally threaded sidewall 4 and is in communication with and generally axially aligned with the internally threaded diameter portion defined by the sidewall 4. Additional component parts of the fitting will be described in detail with reference to FIGS. 1, 2 and 5. The internally threaded sidewall 4 threadably receives therein a cutter assembly generally indicated at 14. Such assembly includes an enlarged diameter ram 16 which is externally threaded for threadable mating engagement with the internally threaded portion 4. One circular end of the ram includes a generally hexagonal recess 18. The bottom wall of the recess 18 is provided with a reduced diameter internally threaded bore 20 having threads of reverse pitch angle by comparison to the threaded sidewall 4 and which communicates with the other circular end 21 of the generally cylindrical ram 16. A generally reduced diameter piston 22 is provided with complementary external threads for threadable mating engagement within the internally threaded bore 20. At one circular end, the generally cylindrical piston 22 is provided with a reduced hexagonal recess 24 which, as shown in FIG. 5, is in axial alignment with the enlarged hexagonal recess 18. The other circular end 25 of the piston 22 is provided with a reduced cylindrical, depending stem 26, in turn provided thereon with an integral reduced cylindrical tip 28. A generally cylindrical bushing 30, provided therethrough with a central bore 32, is received over the stem portion 26 and abutting the end 25. In addition, a generally cylindrical ring or wafer 34 of a noncompressible but resilient material such as butyl rubber or neoprene is provided with a central bore 36 allowing the ring to be received over the stem 26. An inverted generally cylindrical cup-shaped cutter 38 is characterized by a generally circular bottom wall 40 provided thereon with a projecting cylindrical relatively thin cutting blade 42, thereby giving the cutter 38 an inverted cup-shaped configuration. The bottom wall 40 is provided with a generally central reduced diameter aperture 44 which is received over the reduced cylindrical tip 28 of the piston stem 26. The cutter 38 accordingly is received in stopped relationship against an end 27 of the stem 26. As shown in FIG. 5, the tip 28 is then expanded as shown at 46 in FIG. 5, for example, by peening in order to positively retain the cutting blade 38 at the stem end 27.

As shown in FIGS. 1 and 5, a generally cylindrical or tubular insert is generally shown at 48 and includes a plurality of spaced annular barbs 50 distributed along its outer cylindrical length thereof. At one circular end of the tubular insert 48 is provided an enlarged annular rim or lip 52 which, as shown in FIG. 5, is freely received over the cutter 38, the wafer 34 and the bushing 30 in abutment against the end 21 of the ram 16. Also as shown in the Figure, the bushing 30 and the expandable ring 34 are received internally of the tubular insert 48.

In operation, reference will be made to FIGS. 1, 3 and 5. As shown in the Figures, the flange portion 10 is located in registration on the cylindrical outer surface of a sidewall 54 of a pipeline 56. The tubular stem 6 is coupled by conventional techniques to an outlet pipeline (not shown) which typically forms a tap-off distribution line. A pair of conventional clamping bands 58 are received over a respective end of the flange 10 and in encircling relationship over the pipeline 56. Upon tightening the band clamps in the conventional manner, the fitting 1 will be positively retained in a desired position on the cylindrical sidewall 54 of the pipeline 56. As shown in FIGS. 4 and 6, an elbow-shaped hexagonal wrench 60 includes a reduced hexagonal tip 62. As shown in FIG. 6, the hexagonal wrench is inserted within the complementary recess 18 of the ram 16, with the reduced hexagonal tip 62 in registration within the complementary recess 24 of the piston 22. The wrench is thereby utilized by an operator to threadably advance both the piston and ram along the internal diameter threaded portion 4 of the tubular member 2. Since the piston is oppositely threaded, its tendency for rotation by the hexagonal tip will be to retract from the ram in a direction opposite to the threaded advancement of the ram. This tendency assures that the piston will remain stopped against the enlarged hexagonal portion 60 and thereby in fixed position with respect to the advancing ram 16. The thin sharpened blade 42 is thereby rotatably advanced through the bore 12 of the flange portion 10 and is rotatably driven to cut through the sidewall 54 of the pipeline. As the cutter cuts through the sidewall it removes a coupon portion 64 from the sidewall 54. As shown in FIG. 6, the coupon portion 64 is wedgingly retained within the encircling blade 42 of the cutter 38, as the threadable advancement of the cutter is continued so as to remove the coupon portion 64 from the sidewall 54 of the pipeline and thereby form a circular aperture 66. The aperture 66 is of a dimension corresponding to the outer diameter of the cutter blade 42. As the ram 16 and piston 22 are continued to be threadably advanced, the end 21 of the ram 16 will engage the rim 52 of the tubular insert 48 and forcibly advance the insert into the bore 12 of the flange portion 10 and also into the aperture 66 in the pipeline sidewall 54. The ram and piston are advanced until the rim 52 seats on the bottom wall 11 of the fitting. As shown in FIG. 6, since the diameter of the aperture 66 is formed by the cylindrical cutter 38 which is of smaller diameter than the tubular insert 48, the insert will be wedgingly seated with an interference fit internally of the aperture 66. In addition, the tubular insert is also wedgingly retained by an interference fit in the bore 12 of the flange 10. The annular barbs 50 of the insert 48 are shown with a generally wedge-shaped cross section and with relatively sharp protruding edges, which edges bite into portions of the fitting which encircle and define the aperture 12 and also into the pipeline sidewall 54 which encircles and defined the aperture 66. Accordingly, the interference fit of the insert 48, together with the biting action of the annular barbs, thereon positively secure and sealably imbed the insert 48 in both the fitting and the pipeline sidewall 54. In addition, such interference fit and biting action assures a pressure-tight seal between the imbedded insert and the encircling fitting and pipeline sidewall. Also such interference fit and biting action positively anchors the fitting 1 to the pipeline 56. Thus, as the ram 14 is threadably advanced to rotate and advance the cutter 38 and remove the coupon portion 64 from the pipeline sidewall 54, the tubular insert 48 is also simultaneously advanced serially of the cutter to immediately wedgingly interfit into the aperture 56 and form a gas tight seal therewith to prevent escape of the gaseous or fluidic media being conveyed in the pipeline 56. In addition, the sealing ring 34 is retained wedgingly within an encircling end portion 68 of the insert 48 which protrudes into the pipeline interior. The ring 34 provides a seal to prevent escape of the conveyed media through the insert 48. As a further feature of the invention, the tubular insert 48 and the sealing ring 34 together provide a seal for preventing communication of the pipeline interior with the outlet passageway 8 of the fitting 1.

With more particular reference to FIGS. 6, 7 and 8 of the drawings, a further feature of the present invention will be described in detail. As shown in FIG. 7, with the rim 52 of the insert 48 seated on the bottom wall of the internally threaded tubular portion 4, the hexagonal wrench 60 is removed and replaced by a relatively small dimension hexagonal wrench 70 which is matingly received only in the hexagonal recess 24 of the piston 22. The wrench 70 is rotated by an operator in the conventional manner so as to threadably retract the piston 22 with respect to the ram 16 which remains in its foremost advanced position as shown in FIGS. 6 and 7. With the threads of the piston 22 being of reverse pitch angle with respect to the threads on the ram 16, the rotating motion which retracts the piston 22 in the direction of the arrow 72 has a tendency to advance the piston 22 threadably in the opposite direction to assure that the ram remains positively abutting against the insert rim 52 seated on the bottom wall 11. As shown in FIG. 7, such retraction of the piston 22 tends to retract the cutter 38 into the terminal end 68 of the tubular insert 48. The sealing ring 34 is of noncompressible resilient material which will progressively expand as it is progressively compressed between the cutter 38 and the relatively rigid bushing 30. Such compression forcibly resiliently expands the relatively incompressible ring 34 radially outward against the protruding terminal end portion 68 expanding or flaring it radially outward. The radially expanded or flared terminal end portion 68 thus provides a flared lip on the tubular insert 48, forcing it into engagement with and overlying a portion of the pipeline sidewall which encircles the aperture 68. As a result the flange portion 10 of the fitting and the sidewall 54 of the pipeline are compressibly gripped between the radially projecting rim 52 and the now radially flared terminal end portion 68, thereby assuring that the fitting 1 is positively anchored in fixed location on the pipeline, with the gripping action preventing pull-out of the insert 48 and consequent separation of the fitting from the pipeline. In the usual application, the fitting is buried in the earth, with the above-described gripping action withstanding creep or plastic flow of the pipeline material with the passage of time as well as shifting of the earth due to freezing and thawing.

As shown in FIG. 7, after the terminal end 68 has been sufficiently flared, the wrench 70 is rotated so as to again advance the piston 22 with respect to the ram 16 in the direction of the arrow 74. Such advancement of the piston 22 advances the cutter 38 thereby releasing its compression on the incompressible sealing ring 34, and allowing return of the ring to its original dimension as shown in FIGS. 6 and 9. The piston 22 is threadably advanced as described until the terminal end 25 thereof seats against the bushing 30. This will indicate to an operator that sufficient advancement of the piston 22 has been accomplished.

As shown in FIG. 9, with the ring 34 returning to its original shape, it is of sufficient small diameter to be retracted through the insert 48 which remains sealably imbedded in place in the fitting and pipeline sidewall 54. Thus, once again the hexagonal wrench 60 is received in the recess 18 of the ram 16 and actuated by an operator so as to threadably retract the ram 16, the piston 22, the bushing 30, the ring 34 and the cutter 38 with the imbedded insert remaining in fixed position to permit communication of the pipeline interior with the interior of the fitting and the outlet passageway 8, with the interior of the tubular insert 48 providing a passageway therebetween. As the sealing ring 34 is removed from the tubular insert 48, fluid matter is allowed to escape from the pipeline 54 into the fitting 1. However, since the cutter assembly 14 remains threadably secured in the tubular member 2, relatively insignificant amounts of gaseous fluid will escape past the ram into the atmosphere. To positively seal the end of the tubular portion 2, an inverted cap 76 is threadably advanced over an externally threaded portion 78 of the tubular portion 2 with an annular sealing ring 80 in compression between the cap 76 and the terminal end 82 of the tubular portion 2. The ram 14 is permitted to remain in the tubular portion 2, and the cap 76 and sealing ring 80 prevent leakage of any relatively minute amounts of fluid material which would escape past the ram 14.

Although a preferred embodiment of the present invention has been disclosed in detail, other embodiments and modifications which would be obvious to an artisan are intended to be covered by the spirit and scope of the appended claims, wherein:

What is claimed is:

1. A method of tapping into a pipe and anchoring a fitting thereto, said method comprising the steps of:
    a. providing a substantially tubular fitting having a bore therethrough, said bore having an upwardly facing shoulder therein;
    b. movably positioning a pipe-cutting assembly and a tubular insert with one end being flanged into said bore;
    c. placing said fitting on said pipe;
    d. actuating said pipe-cutting assembly thereby cutting an aperture in said pipe;
    e. driving said tubular insert downwardly so that said flanged end abuts said shoulder in said bore and another end protrudes into said pipe through said aperture; and
    f. flaring said another end of said tubular insert against the inside wall of said pipe thereby anchoring said fitting to said pipe.

2. A fitting for tapping into a pipeline, comprising: a portion of said fitting for engaging a pipeline and provided with a bore in communication with the interior of said fitting, a ram threadably received internally of said fitting, a piston threadably received in said ram, a deformable, relatively incompressible sealing member received over said piston, a cutter blade received over said piston, a tubular insert freely received over said cutter blade and said sealing member with an end of said tubular insert abutting against an end of said ram, said ram and said piston together being threadably advanced internally of said fitting to advance said cutter through said bore of said fitting and to cut through and remove a coupon portion from said pipeline, said ram and said piston further being threadably advanced internally of said fitting to serially advance said tubular insert and said sealing member into said bore of said fitting and at least partially into said pipeline, said piston being threadably retractable with respect to said ram to compress said cutter against said sealing member and thereby forcibly radially expand said sealing member and to flare at least a portion of said tubular insert, said ram, said piston, said sealing member and said cutter being threadably retractable from said tubular insert to allow communication of the interior of said pipeline with the interior of said fitting through the interior of said tubular insert.

3. A fitting for tapping into a pipe which comprises:
    a. a substantially tubular fitting having a bore extending therethrough with said bore having an upwardly facing shoulder therein;
    b. a ram threadably received in said bore and having therein a bore having counterclockwise threads;
    c. means on said ram for rotating such in said bore;
    d. a piston having counterclockwise threads thereon threadably received in said bore of said ram whereby said piston is advanced downwardly as said ram is rotated clockwise, said piston further having a stem depending therefrom;
    e. means on piston for rotating said piston independent of said ram;
    f. a bushing positioned on said stem;
    g. a cylindrical cup-shaped pipe-cutter positioned on the lower end of said stem, said cutter adapted to cut an aperture in said pipe as said piston is advanced downwardly by said ram;
    h. a generally non-compressible but resilient cylindrical ring positioned on said stem between said bushing and said pipe cutter; and
    i. a tubular insert movably positioned in said bore of said fitting below said ram and freely received over said piston, said insert having on its upper end a radial, outwardly extending flange for abutting said shoulder in said bore and for being retained thereon by said ram, and a lower end adapted to be received into said pipe via said aperture, and to be forcibly radially expanded against the inside wall of said pipe by said cylindrical ring as said piston is retracted upwardly through said ram.

* * * * *